United States Patent [19]

Ikenoue et al.

[11] Patent Number: 5,101,227
[45] Date of Patent: Mar. 31, 1992

[54] METHOD OF AND APPARATUS FOR PRINTING A PHOTOGRAPH

[75] Inventors: Shinpei Ikenoue; Takaaki Terashita, both of Kanagawa, Japan

[73] Assignee: Fuji Photo Film Co., Ltd., Kanagawa, Japan

[21] Appl. No.: 590,826

[22] Filed: Oct. 1, 1990

[30] Foreign Application Priority Data

Oct. 4, 1989 [JP] Japan .................. 1-259197

[51] Int. Cl.$^5$ .............................................. G03B 27/52
[52] U.S. Cl. ............................................ 355/68; 355/77
[58] Field of Search ............ 354/21, 105, 106, 107, 354/109; 355/38, 40, 41, 68, 77

[56] References Cited

U.S. PATENT DOCUMENTS

| | | | |
|---|---|---|---|
| 3,790,275 | 2/1974 | Huboi et al. | 355/68 |
| 4,173,401 | 11/1979 | Harvey | 354/21 |
| 4,420,236 | 12/1983 | Taniguchi et al. | 354/21 |
| 4,641,959 | 2/1987 | Terashita | 355/38 X |
| 4,855,769 | 8/1989 | Slavitter et al. | 354/21 |
| 4,965,627 | 10/1990 | Robison | 355/40 |

FOREIGN PATENT DOCUMENTS 51-117632 10/1976 Japan .
52-13333 2/1977 Japan .
59-214023 12/1984 Japan .

*Primary Examiner*—L. T. Hix
*Assistant Examiner*—D. Rutledge
*Attorney, Agent, or Firm*—Sughrue, Mion, Zinn, Macpeak & Seas

[57] ABSTRACT

Determined is a degree of correction in accordance with a length of at least one of two periods from film manufacturing to photographing or from photographing to film developing. A printing light quantity is corrected in accordance with this degree, and a film image is printed on photographic paper, thereby optimizing the printing light quantity to all films by correcting time-elapsed variations in film characteristics.

20 Claims, 6 Drawing Sheets

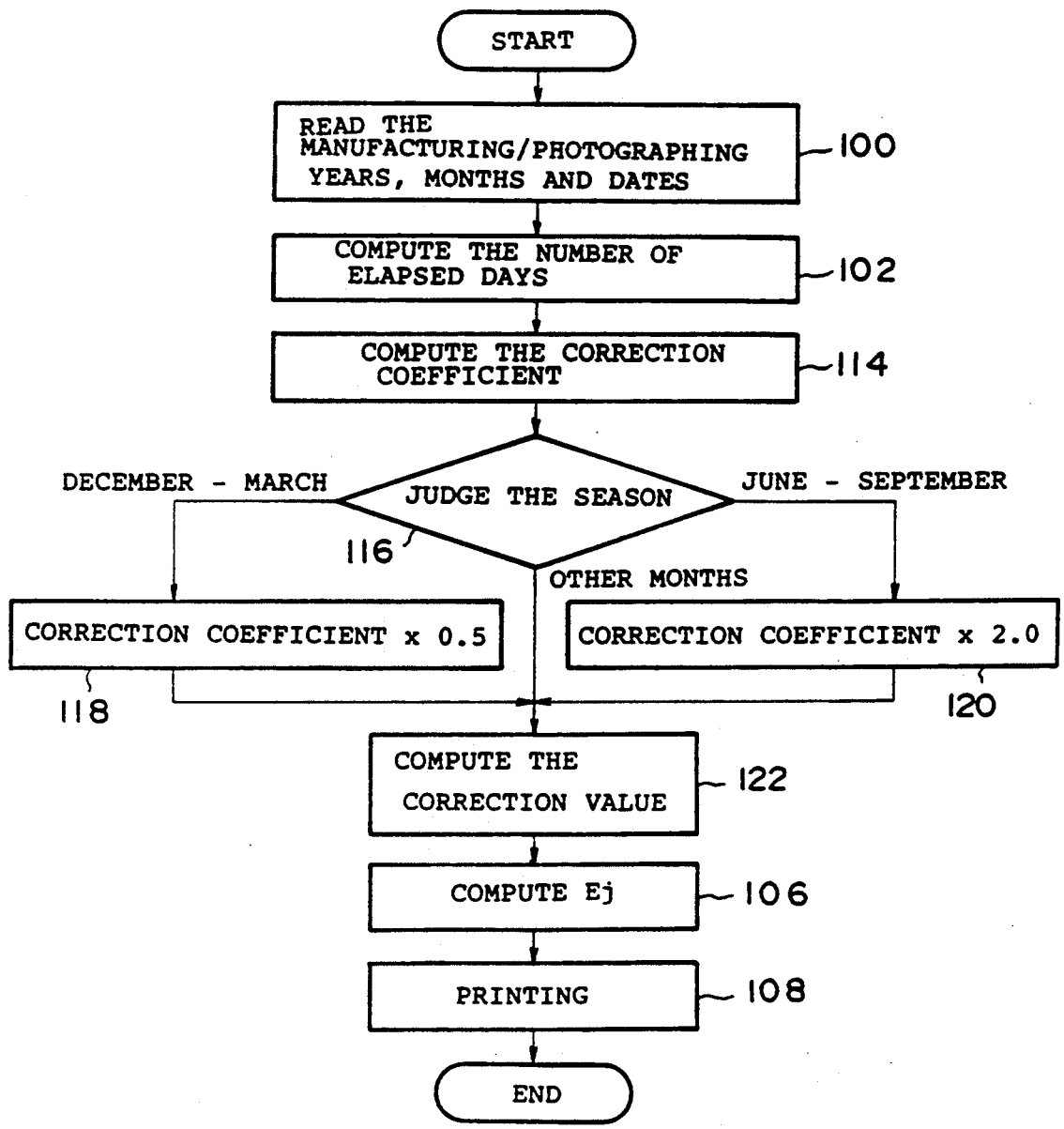

METHOD OF AND APPARATUS FOR PRINTING A PHOTOGRAPH

BACKGROUND OF THE INVENTION

1. Field of the Invention

The present invention relates to a method of and apparatus for printing a photograph and more particularly, to a photograph printing method and apparatus in which a film image is printed on photographic by automatically determining a printing light quantity on the basis of film image density.

2. Description of the Related Art

The light of three colors, i.e., blue (B), green (G) and red (R), transmits a color negative film. It is a known rule of thumb that transmitting ratios of these three color components are typically equal or constant. For this reason, in an automatic printer a printing light quantity (an exposure quantity) is determined in accordance with the following formula.

$$\log Fj = Kj + Dj \tag{1}$$

where logF is the logarithm of the printing light quantity, K is the constant, D is the image density of the negative film, e.g., typically a Large Area Transmittance Density (LATD), measured by a photometer system and j is any one of the color beams B, G and R.

When controlling the printing light quantity by the automatic printer in accordance with the formula (1), however the following defects are caused. A print from a overexposure negative film when photographing a gray subject exhibits a higher density on the whole than a print from a properly exposed negative film. Whereas in a print from an overexposed negative film, the density decreases. Hence, the exposure quantity is determined by correcting Dj of the formula (1) under slope control. On the other hand, even in an automatic printer incorporating a slope control function, an ill-color-blanched defective print tends to be produced from a negative (a heterogeneous light source negative) obtained by photographing with a light source (a fluorescent lamp, a tungsten lamp or the like) remarkably different from the day light or from a color failure negative. For this reason, the exposure quantity is determined by further correcting Dj (color correction) of the formula (1). In this case, an excessive correction with respect to a standard correction (normal correction) is referred to as a high correction, while an extremely small correction is referred to as a lower correction.

In addition to a normal negative (a negative film requiring 3-9 months from film manufacturing to photographing and 1-2 weeks from photographing to film developing), however, there are negatives substantially varied with a passage of time. FIG. 3 shows variations ΔD in print density versus elapsed days (unit is a year: the numeral 1 represents 365 days, and 2 indicates 730 days) from film manufacturing with respect to a certain printing light quantity. Film characteristics change with a passage of time, i.e., with an elapse of days. The variations ΔD in the print density thereby become large. Hence, a degree of the color correction has hitherto been determined on the average of the normal negative and the negative remarkably changed with a passage of time. Therefore, the degree of correction becomes increased for the normal negative, whereby color and density failures tend to take place. Whereas for the negative, substantially varied with an elapse of time, the degree of correction decreases. The problem is that it is difficult to determine an optimum printing light quantity for all the negatives.

The following is an explanation of one known printing method. When manufacturing a film, a reference density is printed on a portion other than a photographic region of the film. The reference density is read during printing to judge the characteristics of the film. Based on this judgment, printing is effected. During a period from film manufacturing to its developing, however, a retrograde of a latent image proceeds. This results in such a problem that the film characteristics can not be obtained with a high degree of accuracy. The reference density and information on the light source are printed during photographing. The density and information are read during printing, thereby judging the film characteristics (Japanese Patent Application Laid-Open Nos. 51-117632, 52-13333 and 59-214023). However, the film characteristics can not, as in the previous case, be accurately obtained because of the retrograde of the latent image from photographing to film developing.

SUMMARY OF THE INVENTION

It is an object of the present invention, which has been devised to obviate the foregoing problems, to provide a photograph printing method and apparatus that are capable of printing a photograph by determining an optimum printing light quantity for all negatives, while variations in film characteristics both from film manufacturing to photographing and from photographing to film developing are caused to reflect the printing light quantity.

To accomplish this object, according to one aspect of the invention, there is provided a photograph printing method of printing a film image on photographic paper by correcting a printing light quantity determined based on a film image density, comprising the step of changing a degree of correction in accordance with a length of at least one of periods ranging from film manufacturing to photographing and from photographing to film developing.

By this photograph printing method, the degree of correction can be incremented with an increasing extension of at least one of the periods from film manufacturing to photographing and from photographing to film developing on the basis of correction of a standard (normal) film.

According to another aspect of the invention, there is provided a photograph printing apparatus comprising: reading means for reading pieces of information representing a film manufacturing time and a photographing time from a film incorporating such information; period computing means for computing periods from film manufacturing to photographing and from photographing to film developiing on the basis of the read information and the information representing the film developing time; measuring means for measuring an image density of the film; and printing light quantity computing means for computing a printing light quantity by correcting the image density to degree corresponding to a length of at least one of the periods from manufacturing to photographing and from photographing to film developing.

Based on the photograph printing method of this invention, the degree to correct the printing light quantity determined based on the image density of the film is changed in accordance with the length of at least one of the periods from film manufacturing to photographing and from photographing to film developing. The film image is then printed on the photographic paper. This makes the printing light quantity correctable in accordance with a degree of time-elapsed variations in the film characteristics. It is therefore possible to print the photograph by determining an optimum printing light quantity irrespective of the degree of the time-elapsed variations in the film characteristics.

When correcting the printing light quantity, the degree of correction can be increased with an increasing extension of at least one of the periods from film manufacturing to photographing and from photographing to film developing on the basis of correction of the normal film. Reversely, the degree of correction may be reduced as one of the periods becomes shorter on the basis of correction of the film with the time-elapsed variations.

In the photograph printing apparatus of this invention, the reading means reads the information incorporated in the film, the information representing the film manufacturing time nad the photographing time. The incorporation of information in the film involves recording the information representing the film manfacturing time and the photographing time on the film or storing the information representing the same into a storage means provided in the film or a film case. Two pieces of time information described above may be itemized either by year, month and data or by year and month.

The period computing means computes the periods from film manufacturing to photographing and from photographing to film developing on the basis of the read information and the information representing the developing time. The time information may similarly be itemized either by year, month and data or by year and month. Such information may manually be inputted via a keyboard to the period computing means. The information may also be recorded on the film or, after storing it in a storage means, read from this storage means by a reading means. Manual inputting of the information indicating the film developing time is suited to simultaneous printing (printing is effected immediately after finishing the film development). Reading of this information is suited to reprinting (printing is performed again because of defective printing or by a reorder after previous printing has been done).

The measuring means measures the image density of the film. The printing light quantity computing means computes the printing light quantity by correcting the image density to a degree corresponding to a length of at least one of the periods from film manufacturing to photographing and from photographing to film developing. The method discussed in connection with the photograph printing method is applicable to this correction.

As described above, the present invention exhibits the following advantages. The time-elapsed variations in the film characteristics can accurately be reflected in the printing light quantity. It is therefore possible to optimize the printing light quantity to all the films.

BRIEF DESCRIPTION OF THE DRAWINGS

Other objects and advantages of the present invention will become apparent during the following discussion taken in conjunction with the accompanying drawings, in which:

FIG. 7 is a flowchart showing a control routine in a second embodiment of the invention.

DESCRIPTION OF THE PREFERRED EMBODIMENTS

Figure 2:
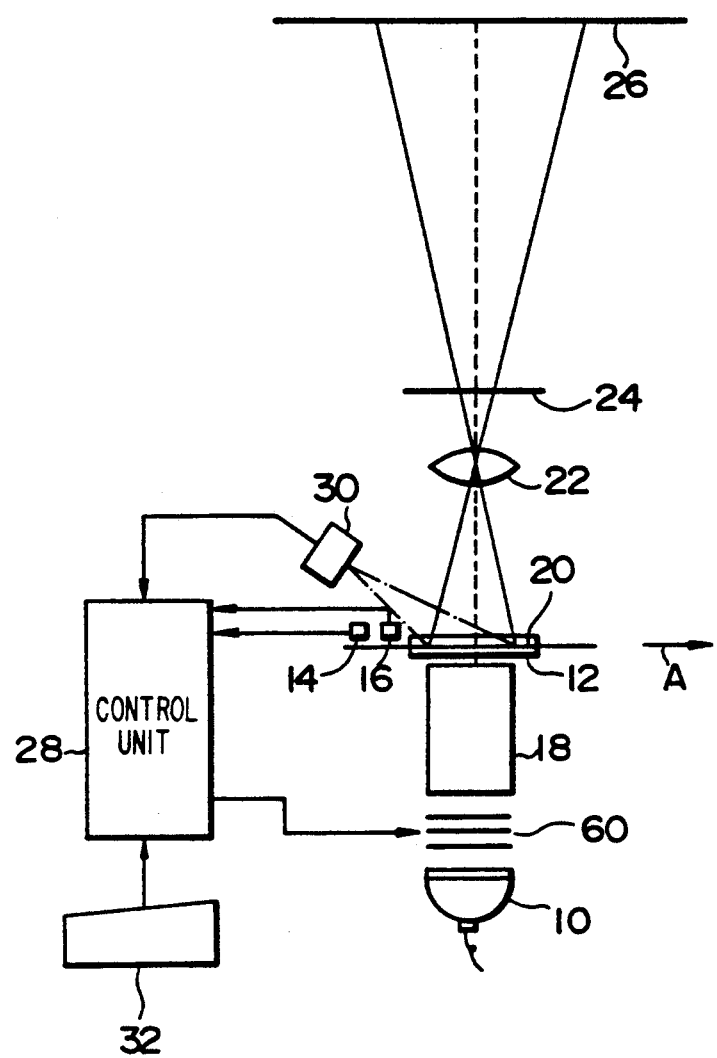
FIG. 2 is a schematic diagram depicting and auto-color-printer to which this invention is applicable.
Figure 3:
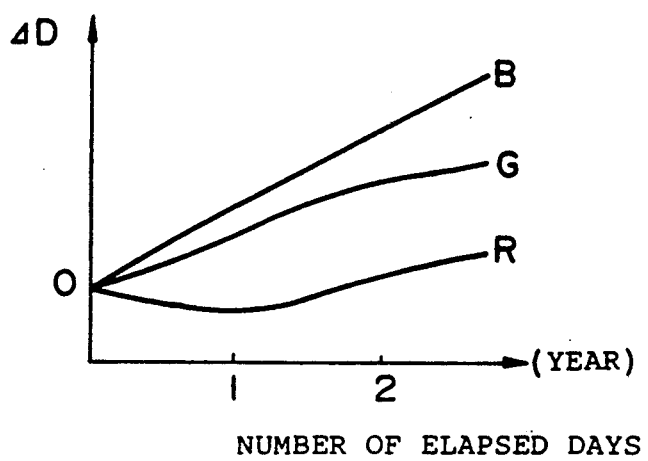
FIG. 3 is a diagram illustrating density variations versus time-elapsed variations.

Embodiments of this invention will be described in detail with reference to the accompanying drawings. There will be described an embodiment in which this invention is applied to a color photograph printing apparatus. A mirror box 18 and lamp house 10 encasing a halogen lamp are, as shown in FIG. 2, disposed downwardly of a negative film carrier 12 for carrying a negative film 20 to a printing unit. A dimming filter 60 is interposed between the mirror box 18 and the lamp house 10. The dimming filter 60 is, as broadly known, composed of three cut filter such as a filter Y (yellow), a filter M (magenta) and a filter C (cyan).

A lens 228 a black shutter 24 and a sheet of a color paper 26 are sequentially disposed above the negative film carrier 12. Beams of light emerging from the lamp house 10 transmit the diming filter 60, the mirror box 18 and the negative film 20. The transmitted light falls on the color paper 26 to thereby form an image thereon.

A two-dimensional image sensor 30 measures an image density by splitting a negative image into a multiplicity of sub-images. In a direction inclined to the optical axis of an image forming optical system, the image sensor 60 is placed in such a position that the sensor 60 is able to measure an image density of the negative film 20.

Figure 4:
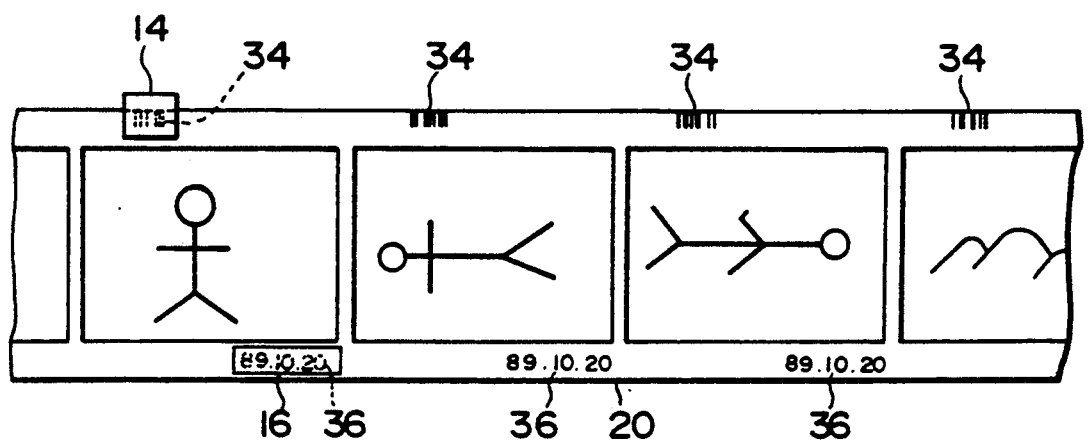
FIG. 4 is a plan view illustrating a film to record pieces of information indicating film manufacturing photographing years, months and dates.

Recorded on the negative film 20 in FIG. 4 is information as a bar code 34 indicating a year, a month and a data of film manufacturing. Information as a numeral 36 indicating a year, a month and a date of photographing is also printed on the film 20. The information indicating the film manufacturing year, month and data may be printed on the film when manufacturing the film. The information indicating the photographing year, month and date may be printed on the film when photographing by utilizing a date copying mechanism incorporated into a camera. Note that the information indicating the film manufacturing year, month and date may be recorded on one appropriate portion of a single film. This recording manner suffices. However, as shown in FIG. 4, the information is recorded on each frame of the film 20. This arrangement offers easy-to-read information when being cut into pieces of negatives.

In the case of the information indicating the photographing year, month and date, these items are in many cases different according to the frames and preferably recorded on each frame.

In FIG. 4, the information indicating the photographing year, month and date is expressed by the numeral 36. The information may, however, be recorded by use of a bar code. Recording of the film manufacturing/photographing year, month and date information may involve the use of optical marks indicated by light emitting diodes or the like in addition to the bar codes. The position to record the information on the film is not limited to the one shown in FIG. 4. For instance, between the film image frames, one-side perforations are eliminated. Instead, an information recording area is provided, and the information may be recorded in this area.

On the upper stream side of the negative film carrier 12, first and second sensors 14 and 16 are disposed in such positions that the sensors are allowed to read the information recorded on the film. The first sensor 14 optically reads the information showing the film manufacturing year, month and date. The second sensor 16 optically reads the imformation showing the photographing sensor 16 and the two dimensional image sensor 30 are connected to a microcomputer-based control circuit 28. A keyboard 32 for inputting the data is connected to the control circuit 28. The control circuit 28 is connected to the dimming filter 60 to control this filter.

The following is a description of a printing control routine executed by the microcomputer in the first embodiment. In this enbodiment, printing is carried out by controlling the dimming filter in accordance with the following formula.

$$\log Ej = Sj \cdot Cj \, (dj - dwj) + dwj + Kj \qquad (2)$$

wherein, $$dj = Dj - NDj \qquad (3)$$

$$dwj = \left( \sum_{j=1}^{3} dj \right) / 3 \qquad (4)$$

where
- j: any one of numerals 1 to 3 representing R, G and B
- Dj: the image density (e.g., a whole picture mean desity) of each film image frame
- NDj: the mean image density of a standard (normal) negative film or of a multiplicity of film frame (e.g., a mean whole picture density)
- Sj: the slope control value
- Cj: the color correction value
- Kj: the constant dependent on characteristics of a printer, a film and photographic paper, and
- Ej: the exposure control value corresponding to the printing light quantity.

In the formula (2), the exposure control value Ej is obtained by use of the mean image density NDj of the standard negative film or of the multiplicity of film frames. Hence, a degree of correction of the standard negative film can be reduced by decreasing the color correction value of the standard negative film. This makes it possible to prevent a color failure of the standard negative film.

Figure 1:
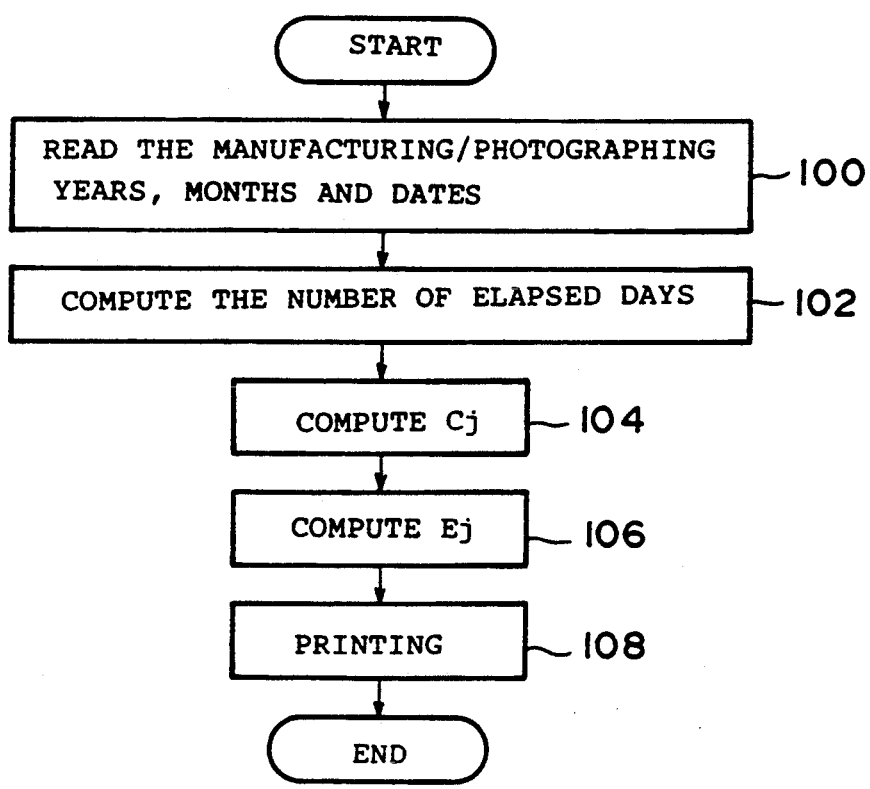
FIG. 1 is a flowchart showing a printing control routine in a first embodiment of the present invention.

FIG. 1 shows a control routine in this embodiment. At a step 100, the first and second sensors 14 and 16 read pieces of information 34 and 36 which indicate the film manufacturing/photographing years, months and dates. The negative film 20 is carrried in an arrowed direction A of FIG. 2. The sensors 14 and 16 are, because of being disposed on the upper stream side of the negative carrier 12, able to read the film manufacturing/photographing year, month and date information before the film stops in a printing position. An execution of simultaneous printing requires a step of previously inputting the information indicating the film developing year, month and date by operating the keyboard 32. It is to be noted that the film developing year, month and date information may be recorded on the negative film 20 when developing the film.

A storage means such as a magnetic tape or an IC is connected to the negative film. Stored in this storage means are the information indicating the film manufacturing/photographing years, months and dates. In general, the film manufacturing year, month and date information is previously stored as a DX code in the film. Therefore, only the information showing the years, months and dates of film manufacturing and of photographing may be stored in the storage means. Employing the storage means requires provision of a unit for reading the information by a magnetic means in place of the optical sensors.

Figure 5:
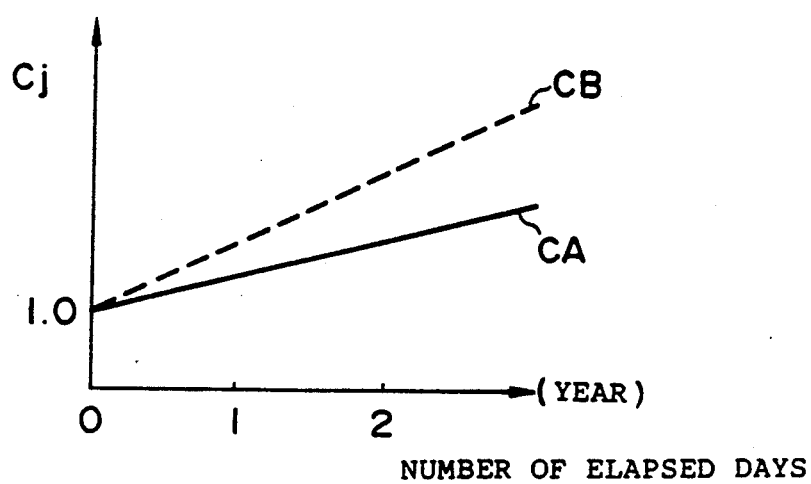
FIG. 5 is a diagram showing a table of color correction values corresponding to the numbers of elapsed days.

At a subsequent step 102, the sensor computes the number of elapsed days (the first number of elapsed days) from the manufacturing year, month and date to the photographing year, month and date and also the number of elapsed days (the second number of elapsed days) from the photograping year, month and date to the film developing year, month and date. This computation is based on the read information and the information inputted from the keyboard. At a step 104, the color correction values Cj corresponding to the first and second number of elapsed days are calculated by an interpolation method from a table of the color correction values Cj corresponding to the numbers of elapsed days. In the table of the color correction values Cj, as shown in FIG. 5, a straight line CA represents the color correction value corresponding to the first number of elapsed days, while a straight line CB represents the color correction corresponding to the second number of elapsed days. In this table, when the number of elapsed days is 0, the color correction value of the standard negative film is given by Cj=1.0. The reason why a slope of the straight line CB is larger than that of the straight line CA will be elucidated as follows. A retrograde of a latent image takes place during a period from photographing to film developing. The degree of correction is required to increase as compared with a case where no latent image exists. The color correction value Cj of the formula (2) is a value given by adding color correction values obtained from the straight lines CA and CD or any one of these color correction values or an arithmetic mean value of the two color correction values. In the next step 106, the exposure control value Ej is calculated in accordance with the formula (2). The dimming filter is controlled to thereby effect printing at a step 108. Note that Dj of the formula (2) is given in a photometric value of the two-dimensional image sensor 30.

Next, a second embodiment of the invention will be explained. In the second embodiment, the exposure control value Ej corresponding to the printing light quantity is obtained by the following formula.

$$\log Ej = Sj\{\alpha \cdot Dj + (1-\alpha)ADj - NDj\} + Kj \qquad (5)$$

where $\alpha$ is the weighting coefficient and ADj is the means density of a multiplicity of frames.

Figure 6:
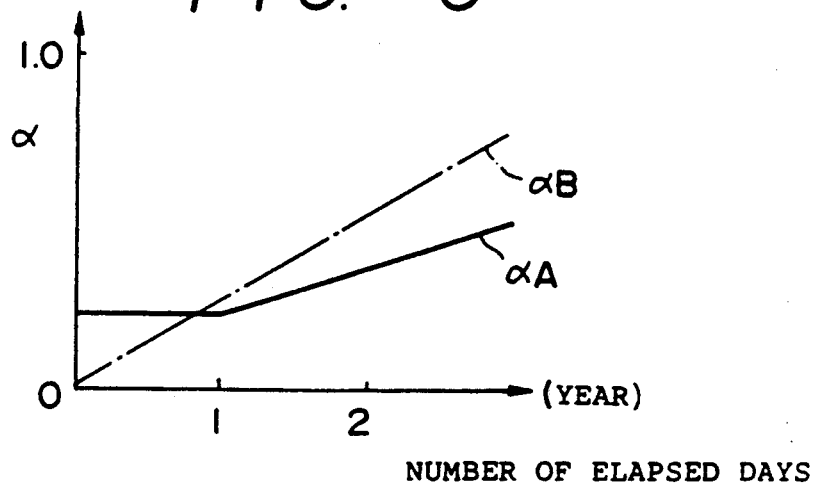
FIG. 6 is a diagram showing a table of weighting coefficients corresponding to the days elapsed.

A control routine in the second embodiment is substantially the same as that shown in FIG 1, and the illustration is omitted. The weighting coefficient corresponding to the elapsed days is computed from the table of FIG. 6 at a step 104. The exposure control value Ej is computed on the basis of the formula (5) at a step 106. Shown in the table of the weighting coefficients $\alpha$ of FIG. 6 are a broken line $\alpha A$ representing the weighting coefficient corresponding to the first number of elapsed days and a straight line $\alpha B$ representing the weighting coefficient corresponding to the second number of elapsed days. When the number of elapsed days is 0, it implies a weighting coefficient of the standard negative film. The exposure control value is arithmetically given by substituting any one of the two weighting coefficients obtained from the table or a sum of the two coefficients or an arithmetic means value thereof. In this embodiment, the degree of correction is incremented with a larger value of weighting coefficient $\alpha$.

In the embodiments discussed above, the coefficient Kj dependent on the characteristics of the printer, film and photoghraphic paper is obtained by the following formula (6). The degree of correction may be varied in accordance with the number of elapsed days.

$$Kj = K1j + K2j \qquad (6)$$

where K1j is the constant dependent on the characteristics of the printer, film and photographic paper and K2j is the correction quantity corresponding to the time-elapsed variations.

The correction quantity K2j is correctable in the following manner. Prescribed in the table are a first correction quantity corresponding to the first number of elapsed days and a second correction quantity corresponding to the second number of elapsed days. The correction of the quantity K2j can be done by employing a sum of the first and second correction quantities or any one of the first and second correction quantities or an arithmetic value thereof.

Note that the color correction coefficients and the weighting coefficients are expressed as continuously-varied-quantities but may be discretely-varied quantities. The values to change the degree of correction may the correction value kj and the slope control value Sj of the formula (1) and (5) in addition to the color correction coefficients and the weighting coefficients.

A third embodiment of the invention will next be described referring to FIG. 7. In the third embodiment, both of the formulae (2) and (5) are usable. Therefore, the description is made, wherein the color correction value and the weighting coefficient are used as correction coefficients. Incidentally, the components, shown in FIG. 7, corresponding to those of FIG. 1 are marked with the like symbols, and the explanation thereof is omitted. In the third embodiment, the degree of correction is further varied according to seasons. At a step 114, the correction coefficients corresponding to the first and second numbers of elapsed days are computed, respectively. Judged at a step 116 are seasons from film manufacturing to photographing and from photographing to film developing. If the seasons judged at the step 116 is the summer (e.g., June to September), the correction coefficient computed at the step 114 is multiplied by a first predetermined value (e.g., 2.0) at a step 120. Whereas if the season judged at the step 116 is the winter (e.g., December to March), at a step 118 the correction coefficient is multiplied by a second predetermined value (e.g., 0.5) smaller than the first predetermined value of step 120. If the seasons is one other than the above-mentioned, the operation proceeds directly to a step 122. Computed at the step 122 is a sum of the correction coefficients multiplied by the foregoing predetermined values and corresponding to the first and second numbers of elapsed days. An arithmetic means value thereof is also computed. As a result, the correction values employed in the formulae (5) and (6) are calculated. If a film used for photographing in the summer is to be developed in the winter, the correction coefficient corresponding to the first number of elapsed days is multiplied by the first predetermined value. Then, the correction coefficient corresponding to the second number of elapsed days is multiplied by the second predetermined value. The predetermined value for the summer is set large. It is because the summer exhibits larger variations in property than in the winter due to higher temperatures.

In the embodiment given above, the correction coefficients are changed depending on the seasons. The printing light quantity may be controlled by setting an arithmetic formula for the exposure control value according to the photographing time, i.e., the seasons. This arrangement makes it possible to increase an exposure accuracy of a negative of a low contrast as seen in a snowscape. In a printing system using an added value of the photometric data of the multiplicity of frames or a mean value thereof, a film or frames showing a large number of elapsed days are inhibited from being employed as data; or alternatively a part of them may be used.

In the embodiment discussed above, pieces of information itemized by year, month and date are employed as the information representing the film manufacturing time, the photographing time and the developing time. However, the information itemized by year and month may also be usable. In this case, the periods from film manufacturing to photographing from photographing to film developing may be expressed as the number of elapsed days.

Although the illustrative embodiment have been described in detail, it is to be understood that the present invention is not limited to those embodiments. Various changes or modifications may be effected therein by one skilled in the art without departing from a scope or spirit of the invention.

What is claimed is:

1. A method of printing a photograph, comprising the steps of:
   (a) determining a degree to correct a printing light quantity determined on the basis of a film image density in accordance with a length of at least one of two periods from film manufacturing to photographing and from photographing to film developing; and
   (b) printing a film image on photographic paper by correcting said printing light quantity on the basis of said degree.

2. The method as set forth in claim 1, wherein the step (a) is conducted so as to increase said degree of correction as at least one of said two periods becomes longer on the basis of correction of a normal film.

3. The methods as set forth in claim 1, wherein the step (a) is conducted so as to decrease said degree of correction as at least one of said two periods becomes shorter on the basis of correction of a film varied with a passage of time.

4. The method as set forth in claim 1, wherein said period from film manufacturing to photographing is the number of elapsed days from the film manufacturing year, month and date to the photographing year, month and date, and said period from photographing to film developing is the number of elapsed days from the photographing year, month and date to the film developing year, month and date.

5. The method as set forth in claim 1, wherein said period from film manufacturing to photographing is the elapsed of months from the film manufacturing year and month to the photographing year and month, and said period from photographing to film developing is the elapsed number of days from the photographing year, month and date to the film developing year, month and date.

6. The method as set forth in claim 1, wherein the step (a) is conducted so as to increase said degree of correction associated with the length of said period from photographing to film developing to a greater extent than said degree of correction associated with the length of said period from film manufacturing to photographing.

7. The method as set forth in claim 1, wherein said degree of correction effected in the step (a) is changed according to the season.

8. The method as set forth in claim 7, wherein said degree of correction is increased more in the summer than in the winter.

9. An apparatus for printing a photograph, comprising;
   reading means for reading pieces of information representing the manufacturing time at which a film was manufactured and the photographing time at which said film was exposed from a film incorporating such information;
   period computing means for computing periods from said manufacturing time to said photographing time and from said photographing time to a developing time at which said film was developed on the basis of said read information and information representing the developing time of the film;
   measuring means for measuring an image density of the film; and
   printing light quantity computing means for computing a printing light quantity by correcting said image density to a degree corresponding to a length of at least one of said periods from said manufacturing time to said photographing time and from said photographing time to said developing time.

10. The apparatus as set forth in claim 9, wherein said printing light quantity computing means computes said printing light quantity by making a correction incrementally with an increasingly longer extension of at least one of said periods from said manufacturing time to said photographing time and from said photographing time to said developing time.

11. The apparatus as set forth in claim 9, wherein said printing light quantity computing means computes said printing light quantity by decreasing said degree as at least one of said periods becomes shorter, said periods ranging from said manufacturing time to said photographing time and from said photographing time to said developing time.

12. The apparatus as set forth in claim 9, wherein said printing light quantity by increasing said degree of correction associated with a length of said period from said photographing time to said developing time to a greater extent than said degree of correction associated with a length of said period from said manufacturing time to said photographing time.

13. The apparatus as set forth in claim 9, wherein said printing light quantity computing means computes said printing light quantity by further changing said degree of correction in accordance with the seasons.

14. The apparatus as set forth in claim 13, wherein said printing light quantity computing means computes said printing light quantity by increasing said dergee of correction more in the summer than in the winter.

15. The apparatus as set forth in claim 9, wherein pieces of information representing the said manufacturing time and said photographing time are recorded on the film.

16. The apparatus as set forth in claim 9, wherein said pieces of information representing the said manufacturing time and said photographing time are stored in a storage means connected to said film.

17. The apparatus as set forth in claim 9, wherein said pieces of information representing the said manufacturing time and said photographing time are so recorded on said film as to correspond to image frames.

18. The apparatus as set forth in claim 9, wherein said information representing the film developing time is inputted to said period computing means.

19. The apparatus as set forth in claim 9, wherein said information representing the film developing time is recorded on said film or stored in storage means connected to said film.

20. The apparatus as set forth in claim 9, wherein said pieces of information representing the said manufacturing time, said photographing time and the said developing time indicate the film manufacturing year, month and date or the film manufacturing year and month, the photographing year, month and date or the photographing year and month, and the film developing year, month and date or film developing year and month.

* * * * *